US012757083B2

(12) United States Patent
Dalsgaard et al.

(10) Patent No.: US 12,757,083 B2
(45) Date of Patent: Oct. 6, 2026

(54) INDICATION FOR PREAMBLE TRANSMISSION AFTER BEAM SWITCH

(71) Applicant: Nokia Technologies Oy, Espoo (FI)

(72) Inventors: Lars Dalsgaard, Oulu (FI); Dmitry Petrov, Espoo (FI); Alessio Marcone, Munich (DE); Mohamad Sayed Hassan, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 295 days.

(21) Appl. No.: 18/294,399

(22) PCT Filed: Aug. 6, 2021

(86) PCT No.: PCT/EP2021/072016
§ 371 (c)(1),
(2) Date: Feb. 1, 2024

(87) PCT Pub. No.: WO2023/011731
PCT Pub. Date: Feb. 9, 2023

(65) Prior Publication Data
US 2024/0349348 A1 Oct. 17, 2024

(51) Int. Cl.
*H04W 36/00* (2009.01)
*H04B 7/06* (2006.01)
(Continued)

(52) U.S. Cl.
CPC .... *H04W 36/0072* (2013.01); *H04B 7/06952* (2023.05); *H04W 74/0833* (2013.01); *H04W 74/0838* (2024.01)

(58) Field of Classification Search
CPC ......... H04W 36/0072; H04W 74/0833; H04W 74/0838; H04W 56/0045; H04W 56/001;
(Continued)

(56) References Cited

U.S. PATENT DOCUMENTS 11,672,019 B2 * 6/2023 Zhou .................... H04W 52/50 370/329
11,736,986 B2 * 8/2023 Kung .................... H04W 36/04 370/331
(Continued)

FOREIGN PATENT DOCUMENTS

EP 3852450 A1 7/2021
WO 2018/028426 A1 2/2018

OTHER PUBLICATIONS

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.
(Continued)

*Primary Examiner* — Brian T O Connor
(74) *Attorney, Agent, or Firm* — SQUIRE PATTON BOGGS (US) LLP

(57) ABSTRACT

Disclosed is a method comprising receiving, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmitting the random-access preamble to the second transmission and reception point after the beam switch.

20 Claims, 11 Drawing Sheets

(51) Int. Cl.
*H04W 74/0833* (2024.01)
*H04W 74/0838* (2024.01)

(58) Field of Classification Search
CPC .......... H04W 74/0836; H04W 56/0055; H04B 7/06952; H04B 7/024
See application file for complete search history.

(56) References Cited

U.S. PATENT DOCUMENTS

| | | | | |
|---|---|---|---|---|
| 11,812,488 | B2 * | 11/2023 | Deenoo | H04B 7/06964 |
| 11,968,724 | B2 * | 4/2024 | Abdelghaffar | H04L 5/0023 |
| 12,089,262 | B2 * | 9/2024 | MolavianJazi | H04W 74/0833 |
| 12,127,270 | B2 * | 10/2024 | Rune | H04W 74/0841 |
| 12,279,326 | B2 * | 4/2025 | Deenoo | H04B 7/06964 |
| 12,302,265 | B2 * | 5/2025 | Tanaka | H04L 1/1812 |
| 2018/0242268 | A1 | 8/2018 | Rune et al. | |
| 2020/0077320 | A1 | 3/2020 | Shimoda et al. | |
| 2022/0240326 | A1 * | 7/2022 | Rune | H04W 74/0866 |
| 2024/0039587 | A1 * | 2/2024 | Liu | H04B 7/0478 |
| 2025/0185099 | A1 * | 6/2025 | Deenoo | H04B 7/06964 |
| 2025/0212068 | A1 * | 6/2025 | Gu | H04W 16/28 |
| 2026/0012271 | A1 * | 1/2026 | MolavianJazi | H04B 17/318 |

OTHER PUBLICATIONS

"3rd Generation Partnership Project, Technical Specification Group Radio Access Network; NR; Medium Access Control (MAC) protocol specification (Release 16)", 3GPP TS 38.321, V16.5.0, Jun. 2021, pp. 1-157.

"3rd Generation Partnership Project; Technical Specification Group Radio Access Network; NR; Requirements for support of radio resource management (Release 17)", 3GPP TS 38.133, V17.2.0, Jun. 2021, 3177 pages.

"WF on FR2 HST Deployment Scenario Analysis", 3GPP TSG-RAN WG4#98-bis-e Meeting, R4-2106100, Samsung, Apr. 12-20, 2021, pp. 1-16.

"WF on FR2 HST RRM requirements", 3GPP TSG-RAN WG4 Meeting #99-e, R4-2108342, Agenda: 9.8.4, Nokia, May 19-27, 2021, pp. 1-22.

"Enhancement on HST-SFN deployment", 3GPP TSG-RAN WG1 Meeting #104b-e , R1-2103198, Agenda: 8.1.2.4, Ericsson, Apr. 12-20, 2021, pp. 1-17.

"3rd Generation Partnership Project; Technical Specification Group Radio Access Network; NR; Physical layer procedures for control (Release 16)", 3GPP TS 38.213, V16.6.0, Jun. 2021, pp. 1-187.

"Timing Advance", 5G | ShareTechnote, Retrieved on Mar. 7, 2024, Webpage available at : https://www.sharetechnote.com/html/5G/5G_TimingAdvance.html.

"3rd Generation Partnership Project; Technical Specification Group Radio Access Network; NR; Physical channels and modulation (Release 16)", 3GPP TS 38.211, V16.6.0, Jun. 2021, pp. 1-134.

"Further discussion on RRM requirements for FR2 HST", 3GPP TSG-RAN WG4 Meeting #99-e , R4-2110238, Agenda: 9.8.4.3, Samsung, May 19-27, 2021, 7 pages.

"Discussion on RRM requirement for FR2 HST", 3GPP TSG-RAN WG4 Meeting #99-e, R4-2109367, Agenda: 9.8.4.3, Apple, May 19-27, 2021, pp. 1-5.

"Discussion on the Rx beams in RRM requirement", 3GPP TSG-RAN WG4 Meeting #99-e, R4-2109366, Agenda: 9.8.4.2, Apple, May 19-27, 2021, pp. 1-5.

"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

"Msc-generator", Sourceforge, Retrieved on Mar. 7, 2024, Webpage available at : https://sourceforge.net/projects/msc-generator/.

International Search Report and Written Opinion received for corresponding Patent Cooperation Treaty Application No. PCT/EP2021/072016, dated May 13, 2022, 13 pages.

"NR support for high speed train scenario in frequency range 2 (FR2)", 3GPP TSG RAN Meeting #92e, RP-211196, Agenda: 9.7.4.6, Samsung, Jun. 14-18, 2021, 27 pages.

* cited by examiner

INDICATION FOR PREAMBLE TRANSMISSION AFTER BEAM SWITCH

RELATED APPLICATION

This application claims priority to PCT Patent Application No. PCT/EP2021/072016, filed Aug. 6, 2021, and entitled "INDICATION FOR PREAMBLE TRANSMISSION AFTER BEAM SWITCH", which is incorporated herein by reference in its entirety.

FIELD

The following exemplary embodiments relate to wireless communication.

BACKGROUND

In a wireless communication system, there may be a large propagation delay difference between transmission and reception points that are located far apart from one another. It may be beneficial to address this propagation delay difference, when performing a beam switch between such transmission and reception points, in order to provide better service to a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmit the random-access preamble to the second transmission and reception point after the beam switch.

According to another aspect, there is provided an apparatus comprising means for: receiving, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmitting the random-access preamble to the second transmission and reception point after the beam switch.

According to another aspect, there is provided a method comprising: receiving, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmitting the random-access preamble to the second transmission and reception point after the beam switch.

According to another aspect, there is provided a computer program comprising instructions for causing an apparatus to perform at least the following: receive, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmit the random-access preamble to the second transmission and reception point after the beam switch.

According to another aspect, there is provided a computer program product comprising program instructions which, when run on a computing apparatus, cause the computing apparatus to perform at least the following: receive, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmit the random-access preamble to the second transmission and reception point after the beam switch.

According to another aspect, there is provided a computer readable medium comprising program instructions for causing an apparatus to perform at least the following: receive, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmit the random-access preamble to the second transmission and reception point after the beam switch.

According to another aspect, there is provided a non-transitory computer readable medium comprising program instructions for causing an apparatus to perform at least the following: receive, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmit the random-access preamble to the second transmission and reception point after the beam switch.

According to another aspect, there is provided an apparatus comprising at least one processor, and at least one memory including computer program code, wherein the at least one memory and the computer program code are configured, with the at least one processor, to cause the apparatus to: transmit, to a terminal device, via a first transmission and reception point, an indication for transmitting a random-access preamble to a second transmission and reception point after a beam switch from a source beam of the first transmission and reception point to a target beam of the second transmission and reception point; and receive the random-access preamble from the terminal device via the second transmission and reception point.

According to another aspect, there is provided an apparatus comprising means for: transmitting, to a terminal device, via a first transmission and reception point, an indication for transmitting a random-access preamble to a second transmission and reception point after a beam switch from a source beam of the first transmission and reception point to a target beam of the second transmission and reception point; and receiving the random-access preamble from the terminal device via the second transmission and reception point.

According to another aspect, there is provided a method comprising: transmitting, to a terminal device, via a first transmission and reception point, an indication for transmitting a random-access preamble to a second transmission and reception point after a beam switch from a source beam of the first transmission and reception point to a target beam of the second transmission and reception point; and receiving the random-access preamble from the terminal device via the second transmission and reception point.

According to another aspect, there is provided a computer program comprising instructions for causing an apparatus to perform at least the following: transmit, to a terminal device, via a first transmission and reception point, an indication for transmitting a random-access preamble to a second transmission and reception point after a beam switch from a source beam of the first transmission and reception point to a target beam of the second transmission and reception point; and receive the random-access preamble from the terminal device via the second transmission and reception point.

According to another aspect, there is provided a computer program product comprising program instructions which, when run on a computing apparatus, cause the computing apparatus to perform at least the following: transmit, to a terminal device, via a first transmission and reception point, an indication for transmitting a random-access preamble to a second transmission and reception point after a beam switch from a source beam of the first transmission and reception point to a target beam of the second transmission and reception point; and receive the random-access preamble from the terminal device via the second transmission and reception point.

According to another aspect, there is provided a computer readable medium comprising program instructions for causing an apparatus to perform at least the following: transmit, to a terminal device, via a first transmission and reception point, an indication for transmitting a random-access preamble to a second transmission and reception point after a beam switch from a source beam of the first transmission and reception point to a target beam of the second transmission and reception point; and receive the random-access preamble from the terminal device via the second transmission and reception point.

According to another aspect, there is provided a non-transitory computer readable medium comprising program instructions for causing an apparatus to perform at least the following: transmit, to a terminal device, via a first transmission and reception point, an indication for transmitting a random-access preamble to a second transmission and reception point after a beam switch from a source beam of the first transmission and reception point to a target beam of the second transmission and reception point; and receive the random-access preamble from the terminal device via the second transmission and reception point.

According to another aspect, there is provided a system comprising at least a first transmission and reception point, a second transmission and reception point, and a terminal device. The first transmission and reception point is configured to: transmit, to the terminal device, an indication for transmitting a random-access preamble to the second transmission and reception point after a beam switch from a source beam of the first transmission and reception point to a target beam of the second transmission and reception point. The terminal device is configured to: receive, from the first transmission and reception point, the indication for transmitting the random-access preamble to the second transmission and reception point after the beam switch from the source beam of the first transmission and reception point to the target beam of the second transmission and reception point; and transmit the random-access preamble to the second transmission and reception point after the beam switch. The second transmission and reception point is configured to: receive the random-access preamble from the terminal device.

According to another aspect, there is provided a system comprising at least a first transmission and reception point, a second transmission and reception point, and a terminal device. The first transmission and reception point comprises means for: transmitting, to the terminal device, an indication for transmitting a random-access preamble to the second transmission and reception point after a beam switch from a source beam of the first transmission and reception point to a target beam of the second transmission and reception point. The terminal device comprises means for: receiving, from the first transmission and reception point, the indication for transmitting the random-access preamble to the second transmission and reception point after the beam switch from the source beam of the first transmission and reception point to the target beam of the second transmission and reception point; and transmitting the random-access preamble to the second transmission and reception point after the beam switch. The second transmission and reception point comprises means for: receiving the random-access preamble from the terminal device.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to “an”, “one”, or “some”

embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
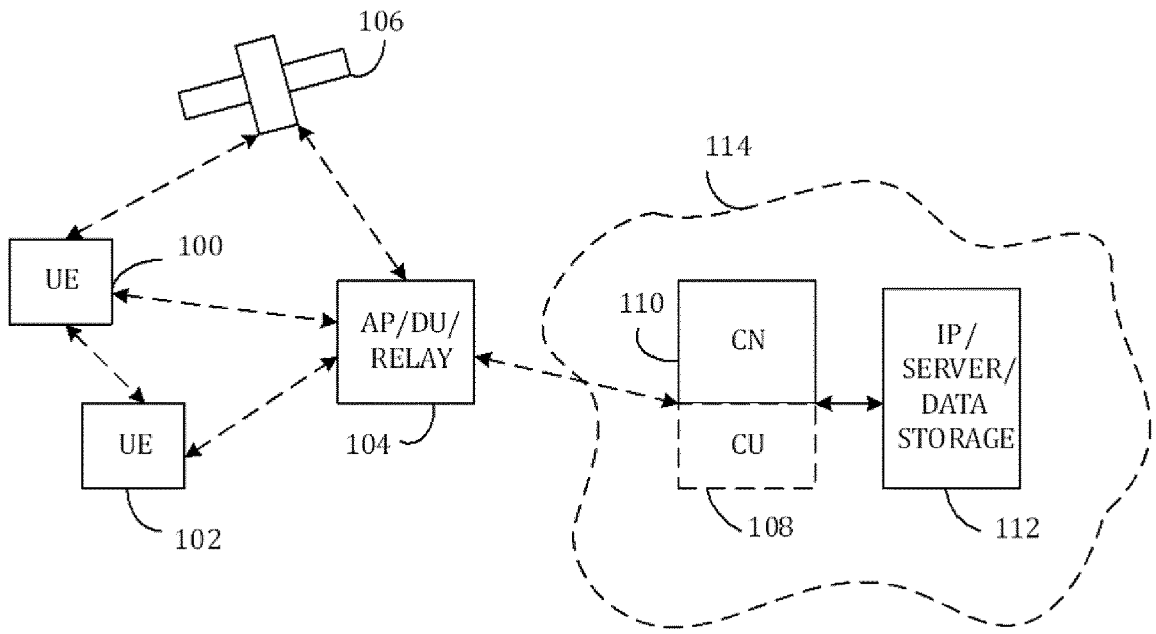
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Furthermore, the (e/g) nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

A UE that is far away from a base station may encounter a larger propagation delay than another UE that is closer to the base station. Due to the larger propagation delay, the uplink transmission of the more distant UE may need to be transmitted somewhat in advance as compared to the closer UE. A timing advance (TA) is a negative offset at the UE between the start of a received downlink (DL) subframe and a transmitted uplink (UL) subframe that can be used to take into account the propagation delay between the UE and the base station. This offset is used to ensure that the DL and UL subframes are synchronized at the base station. Thus, the UE may adjust its uplink transmissions by sending uplink symbols in advance according to the amount of time defined by the TA. In the current NR specifications, TA adjustment consists of two parts: 1) based on the network signaling of TA adjustment to the UE, and 2) UE autonomous UL transmit timing adjustment. In other words, once the UE has been assigned a TA value by the network, the UE may track its DL timing and adjust the transmit timing to be within a set threshold.

The timing of NR UL transmissions may be controlled by the network by means of regularly provided timing advance commands (TAC) in a closed-loop manner. Upon reception of a TAC for a timing advance group (TAG), the UE may adjust uplink timing for physical uplink shared channel (PUSCH), sounding reference signal (SRS) and/or physical uplink control channel (PUCCH) transmissions on the serving cells in the TAG based on the received TAC and a fixed offset value $N_{TA,offset}$. DMRS is a reference signal that may be used by a receiver to estimate the radio channel for demodulation of the associated physical channel. SRS is an uplink reference signal that may be transmitted by the UE to assist the network to obtain the channel state information for the UE.

Downlink, uplink, and sidelink transmissions are organized into frames with a duration of 10 ms, wherein a given frame comprises ten subframes of 1 ms. Uplink frame number i for transmission from the UE shall start $T_{TA}=(N_{TA}+N_{TA,offset})T_c$ before the start of the corresponding downlink frame at the UE. In other words, $T_{TA}$ is the actual timing advance between uplink and downlink to be applied by the UE. $N_{TA}$ is a timing advance value provided by the network (e.g. broadcast or in the TAC). $T_c$ is a basic time unit for NR.

For a subcarrier spacing (SCS) of $2^{\mu}\cdot 15$ kHz, the TAC for a TAG indicates the change of the uplink timing relative to the current uplink timing for the TAG in multiples of $16\cdot 64\cdot T_c/2^{\mu}$, wherein μ indicates a subcarrier spacing configuration. For example, for 120 kHz SCS and μ=3, the TAC step equals to 65.125 ns.

Currently, there are two ways to deliver TA adjustment to a UE: 1) via a random-access response (RAR) as part of a random access (RA) procedure, or 2) via MAC control element (MAC CE). In the first option, the timing correction may be calculated by the network based on the received random-access preamble. In the second option, TA estimation is done at the base station based on one or more reference signals, such as a demodulation reference signal (DMRS) or SRS.

A TAC, in case of a RAR or in an absolute TAC MAC CE, for a TAG indicates $N_{TA}$ values by index values of $T_A=0, 1, 2, \ldots, 3846$, where an amount of the time alignment for the TAG with a SCS of $2^{\mu}\cdot 15$ KHz is $N_{TA}=T_A\cdot 16\cdot 64/2^{\mu}$. The value $N_{TA}$ is relative to the SCS of the first uplink transmission from the UE after the reception of the RAR or absolute TAC MAC CE.

In other cases, a TAC for a TAG indicates adjustment of a current $N_{TA}$ value, $N_{TA}$ old, to the new $N_{TA}$ value, $N_{TA\_new}$, by index values of $T_A=0, 1, 2, \ldots, 63$, where for a SCS of $2\mu\cdot 15$ KHz, $N_{TA\_new}=N_{TA\_old}+(T_A-31)\cdot 16\cdot 64/2\mu$.

For example, the maximum $T_A$ for RAR in frequency range 2 (FR2) with 120 kHz SCS is 250.6 μs. In other cases, it is in the range of −2.1 μs to 2.1 μs.

To establish UL synchronization and RRC connection to a new cell, the UE may go through a random-access procedure. The purpose of performing the random-access procedure may be, for example, initial access, handover, scheduling request, or timing synchronization.

During the random-access procedure, the UE may transmit a random-access preamble to the network (i.e. base station) via the physical random-access channel (PRACH) in order to obtain uplink synchronization. Within the random-access procedure, the preamble transmission may take place in network-configured random-access occasions, which may also be referred to as PRACH occasions. Several consecutive PRACH occasions in the time and frequency domain may be configured within one PRACH slot.

There are two types of RA procedure: contention-based random access (CBRA) and contention-free random access (CFRA). CFRA may also be referred to as non-contention based random access. The main difference between these procedures is that, in CFRA, the preamble assignment (i.e. the preamble index and PRACH occasion to be used for preamble transmission) is predetermined by the network. As the preamble is preassigned by the network, there is no contention-resolution phase, and the procedure is faster compared to CBRA.

In CFRA, a given UE has a dedicated random-access preamble allocated by the network, whereas in CBRA the UE selects the preamble randomly from a pool of preambles shared with other UEs in the cell. In CBRA, the contention (or collision) may occur, if two or more UEs attempt the random-access procedure by using the substantially same random-access procedure on the substantially same resource.

The network may then transmit a random-access response to the UE in response to the random-access preamble. The random-access response (RAR or Msg2) contains the $T_A$ information that was defined based on the random-access preamble (Msg1) transmitted by the UE.

In most cases, the decision to initiate (trigger) the RA procedure is done by the UE. However, there are some cases where the network may need to request the UE to initiate the RA procedure (e.g. CFRA). A physical downlink control channel (PDCCH) order is one such mechanism that can be used to force the UE to initiate the RA procedure. The PDCCH order is triggered by downlink control information (DCI) format 1_0, which carries the random-access preamble index, frequency domain resource assignment, PRACH mask index (i.e. allowed PRACH occasion(s)), etc.

5G NR operating in millimeter wave bands, i.e. FR2 (24.25 GHz to 52.6 GHz), enables high data rates due to the large amount of bandwidth available in FR2. High-speed train (HST) systems are being deployed worldwide at an increasing rate, and there is a need to provide high-speed connections for passengers and HST special services with FR2. However, wireless communication in the HST scenario is characterized by a highly time-varying channel and rapid changes of the closest transmission and receptions points (TRPs) to the train, resulting from the high velocity of the train (for example above 200 km/h).

HST operation in FR2 may comprise single-frequency network (SFN) deployments, wherein different non-collocated remote radio heads (RRHs) may share a single cell identifier. SFN means that the TRPs in the SFN area transmit substantially the same data and reference signals to the train. In the HST scenario, SFN may be applied with dynamic point switching (DPS), which means that data signals are transmitted from a single TRP at a given time, and the TRP used for transmission is dynamically selected based on the relative quality of channels between the train and a few closest TRPs.

In FR2, both the UE and the network may use beamforming in order to ensure a sufficient link budget. For example, in a network deployment for the FR2 HST scenario, the RRH may transmit in a unidirectional manner along the track, or the RRH may transmit in a bidirectional manner along the track.

Figure 2:
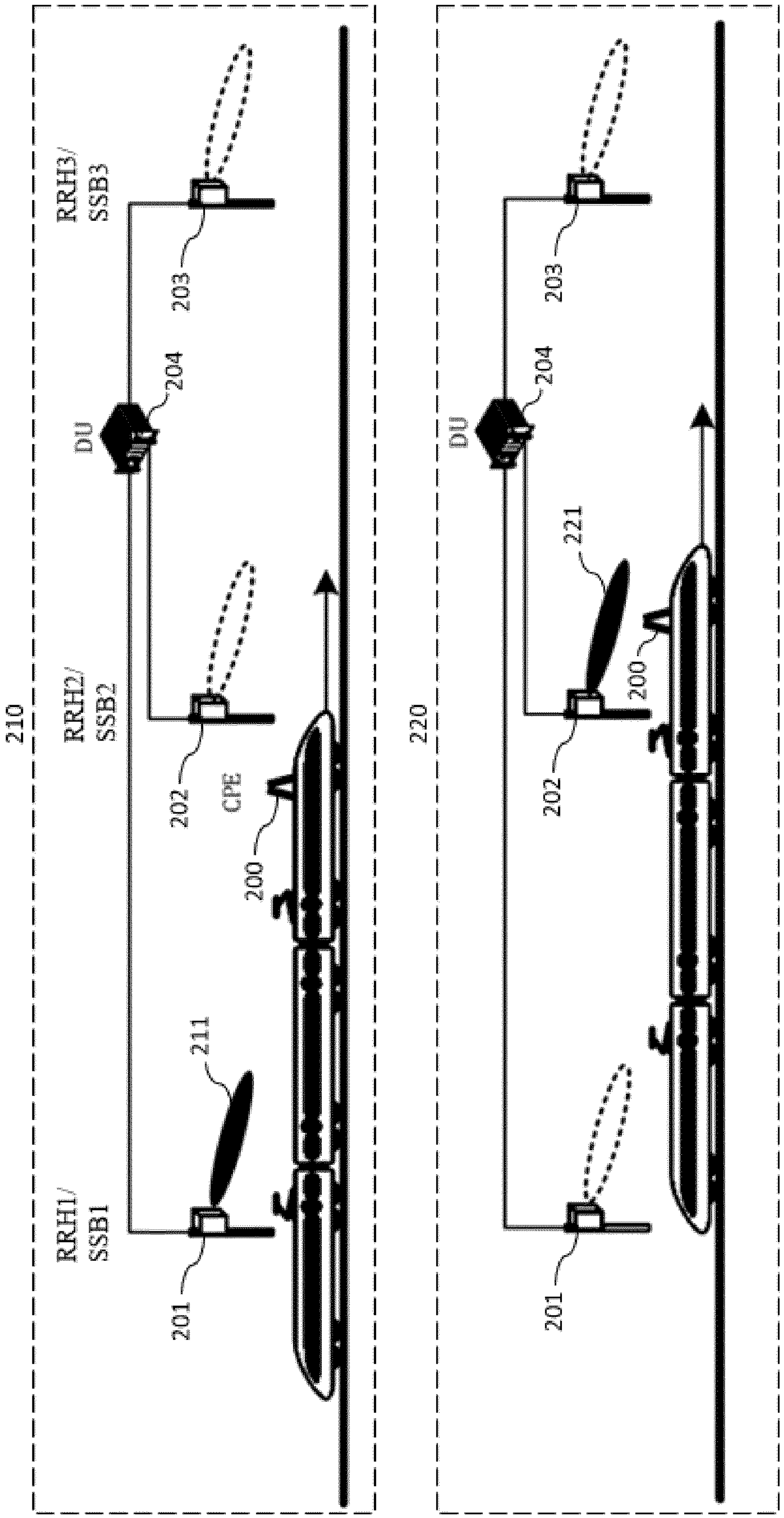
FIG. 2 illustrates an example of a beam switch in a unidirectional high-speed train frequency range 2 network deployment.

FIG. 2 illustrates an example of a transmission configuration indicator (TCI) switch (i.e. beam switch) in a unidirectional HST FR2 network deployment. Referring to FIG. 2, the train may comprise customer-premises equipment (CPE) 200, for example mounted on the roof of the train, for communicating with track-side deployed RRHs 201, 202, 203 for the backhaul link and to further provide on-board broadband connections to user terminals inside the train and/or for other train-specific demands. The CPE may also be referred to as a UE. The RRHs 201, 202, 203 may be connected to a base station 204 (or a DU of a split base station). The RRHs 201, 202, 203 are non-collocated, i.e. they are located at different physical positions. Thus, the base station may use the RRHs to extend the coverage of the cell. As a non-limiting example, the distance between two RRHs 201, 202 may be 500 meters or more.

Referring to FIG. 2, at a first time instant 210, the CPE is served by a first beam 211 of a first RRH 201. As the train is moving, the CPE eventually moves away from the coverage of the first beam 211 and hence the received DL signal quality of the first beam gradually decreases. Thus, at a second time instant 220, a beam switch is performed to switch the CPE to a second beam 221 of a second RRH 202, since the measured signal quality of the second beam is better than the first beam at that time.

Figure 3:
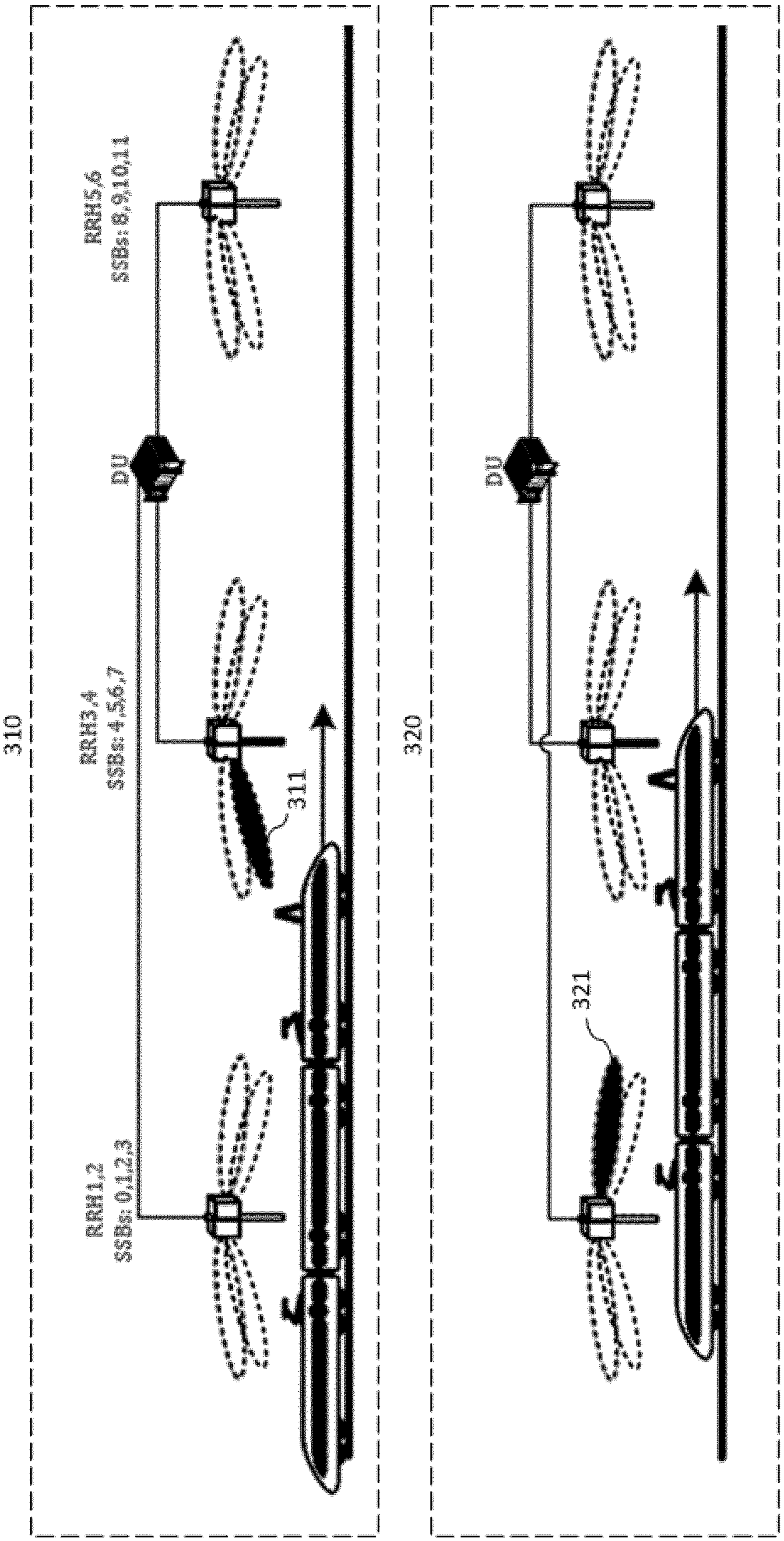
FIG. 3 illustrates an example of a beam switch in a bidirectional high-speed train frequency range 2 network deployment.

FIG. 3 illustrates an example of a TCI switch (i.e. beam switch) in a bidirectional HST FR2 network deployment. At a first time instant 310, the CPE is served by a first beam 311. As the CPE moves away from the first beam 311, the radio signal quality of the first beam decreases. Thus, at a second time instant 320, a beam switch is performed to switch the CPE to a second beam 321, since the received radio signal quality of the second beam is better than the first beam at that time.

As can be seen in FIGS. 2 and 3, a single base station (e.g. gNB) may comprise a plurality of RRHs to make the deployment more efficient in FR2. A given RRH is seen as an access point (AP) from the UE point-of-view. Multiple APs may form one cell, and hence they are seen as one cell by the UE. A given RRH transmits one or more DL beams, wherein a given DL beam is represented by a TCI state. Which of the DL beams (or TCI states) the UE needs to use for DL reception is controlled by the base station via beam management (BM), for example by use of TCI state control, based on UE-assisted measurements and reporting. Therefore, the base station configures the UE with one or more reference signals (RSs), which are used to measure the DL beams. The one or more reference signals may comprise, for example, synchronization signal block (SSB) and/or channel state information reference signal (CSI-RS) and/or CSI-RS configured for other purposes (e.g. L1-RSRP). The UE then reports the measurement results to the gNB using L1 reference signal received power (RSRP) reporting. Based on the reported measurement results, the base station can indicate to the UE which DL RS to use for DL reception (i.e. which DL RS is to be used for representing the DL beam to be monitored by the UE for DL reception). This concept is also known as beam management.

CSI-RS is a downlink reference signal. The CSI-RS that a UE receives is used to estimate the channel and report channel quality information back to the base station, or it may be configured for the purpose of enabling the UE to perform L1-RSRP measurements. For example, the CSI-RS may be used for RSRP measurements during mobility and beam management. CSI-RS may also be used for frequency and/or time tracking, demodulation, and UL channel reciprocity-based precoding.

SSB is a reference signal that may be used for beam management. To enable a UE to find a cell while entering a system, as well as to find new cells when moving within the system, a synchronization signal comprising a primary synchronization signal (PSS) and a secondary synchronization signal (SSS) may be periodically transmitted on the downlink from a given cell. Thus, the PSS and SSS along with the physical broadcast channel (PBCH) can be jointly referred to as the SSB. The synchronization is a process, in which the UE detects a cell, and obtains the time and frequency information of the cell of the wireless network in order for the UE to access the network.

Figure 4:
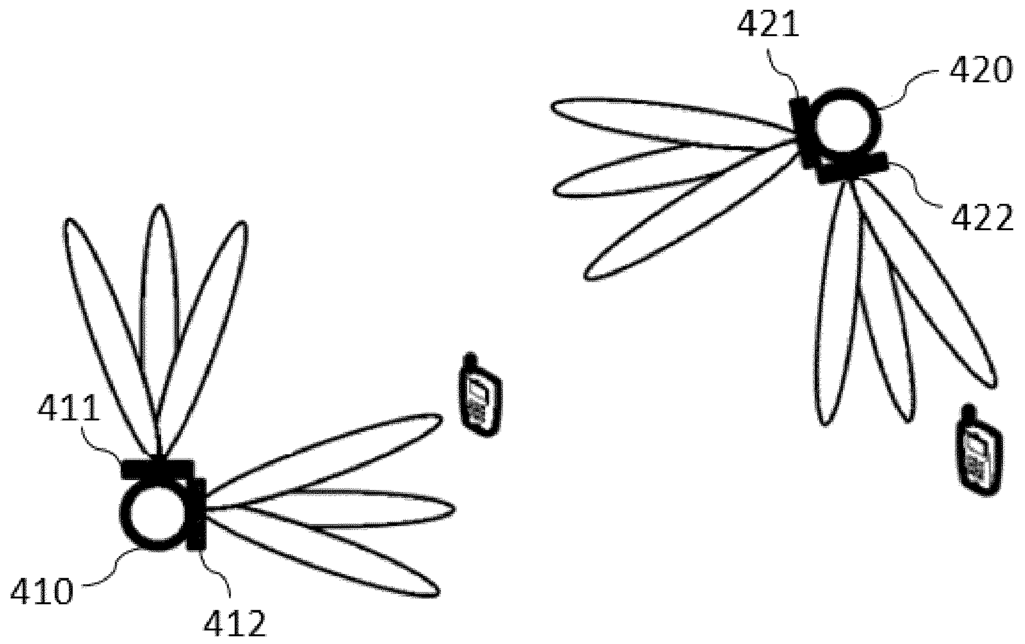
FIG. 4 illustrates an example of beam management with collocated transmission and reception points.

FIG. 4 illustrates an example of beam management with collocated TRPs. Collocated TRPs are TRPs that are located at the substantially same physical position. The BM concept was originally developed with a baseline assumption that the DL transmission point, i.e. AP or TRP or similar, for the DL beams used in the cell would be collocated. Hence, with collocated TRPs, the DL beams are transmitted from substantially the same point in space as seen from the UE. In FIG. 4, a first TRP 410 transmits one or more beams via one or more antenna panels 411, 412, and a second TRP 420 transmits one or more beams via one or more antenna panels 421, 422.

As can be seen in FIGS. 2 and 3, the FR2 HST scenario differs from the baseline assumption that was originally used for developing the BM concept. In the HST case, when using RRHs for covering the track, the RRHs are not collocated (i.e. the RRHs are located at different physical positions). Hence, even if the RRHs are seen as one cell, the RRH locations are physically different and cannot be regarded as being collocated. This is a very different assumption than the one used when originally developing the BM concept. Hence, new BM challenges arise.

One such challenge is related to UE UL synchronization, wherein the baseline assumption is that UL synchronization and hence the TA used by the UE does not change (or need any update), when the network changes the TCI state (due to the collocation assumption). However, when TRPs are not collocated, the baseline assumption is not necessarily valid anymore. Hence, when considering the HST scenario, where the RRHs are not collocated but located physically at different locations, re-use of the UL synchronization (e.g. time alignment) after a beam switch (TCI switch) is not always possible.

When there is a change in the DL timing, there will also be a change in the UL timing, since the UL timing is relative to the DL timing. For example, in the unidirectional scenario illustrated in FIG. 2, when the serving beam is switched from one RRH to another, the DL propagation delay difference between the RRHs may be significant.

Figure 5:
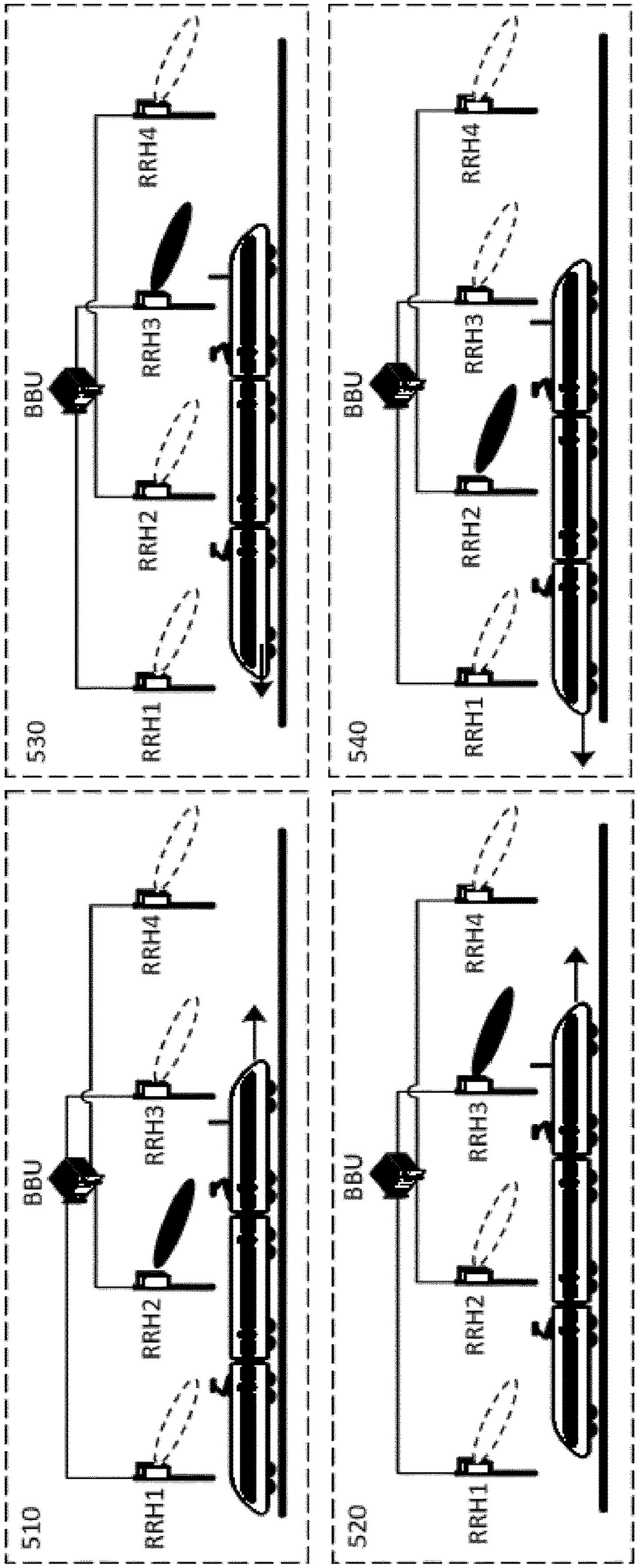
FIG. 5 illustrates an example of a beam switch in a unidirectional high-speed train frequency range 2 network deployment.

FIG. 5 illustrates an example of a unidirectional HST FR2 network deployment, in which there may be a negative or a positive change in the DL propagation delay depending on the train movement direction. For example, if the distance between RRHs is 700 meters, then there may be a negative propagation delay difference of approximately −2.3 μs after switching from the source beam of RRH2 in block 510 to the target beam of RRH3 in block 520. On the other hand, there may be a positive propagation delay difference of approximately 2.3 μs after switching from the source beam of RRH2 in block 530 to the target beam of RRH3 in block 540 due to the opposite direction of movement compared to blocks 510 and 520.

Figure 6:
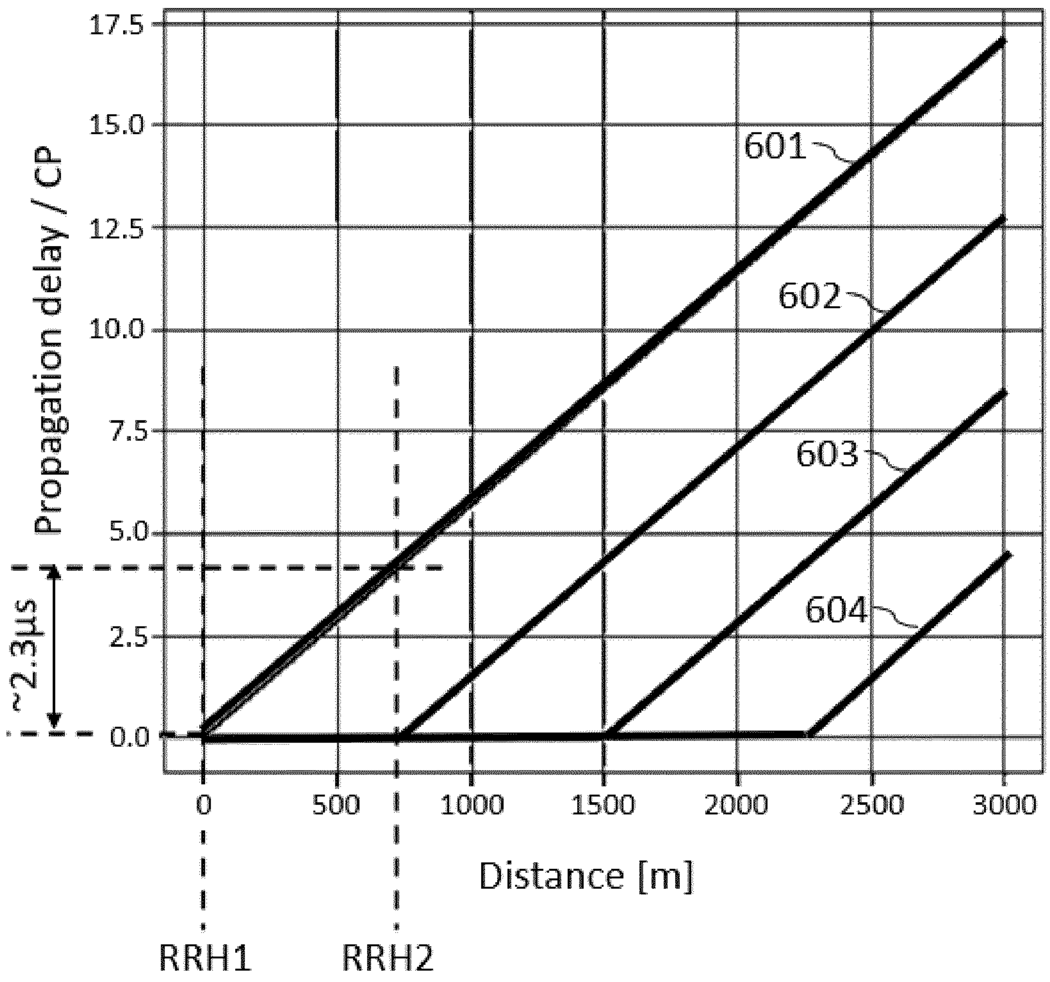
FIG. 6 illustrates propagation delay in relation to cyclic prefix length in frequency range 2.

FIG. 6 illustrates propagation delay in relation to cyclic prefix (CP) length in FR2 for a first RRH 601, a second RRH 602, a third RRH 603 and a fourth RRH 604. For example, the symbol length and CP length at 120 kHz SCS in FR2 are considerably shorter than in FR1 (15 KHz SCS): 8.92 μs vs. 71.35 μs and 0.57 μs vs. 4.69 μs, respectively. Therefore, when changing from one beam served by one RRH to another beam served by another distant RRH, the large change in DL propagation delay will also lead to a large change in the UL transmission delay towards the target RRH. If this larger change is not adjusted, the UL signal received at the RRH will be outside the RRH reception window, since the time offset is considerably larger than the CP. This can result in a complete loss of the transmitted data.

Hence, a mechanism is needed to enhance the TA adjustment at the moment of the TCI state switch (i.e. beam switch) for example in the FR2 HST scenario, when there is a large DL propagation delay difference between the source RRH and target RRH.

The main issues to be considered can be summarized as follows:

1) Change of DL serving beam between RRHs is done by BM, since the RRHs belong to a single cell.
2) TCI state switching does not allow for TA update. Thus, if the target RRH is not collocated with the source beam, the UE may use an incorrect TA for the target RRH at the beam switch.
3) The network cannot measure UE UL signals using the target beam before the TCI state is switched. Hence, propagation delays to other RRHs are not known to the network, and the adjustment cannot be signaled to the UE beforehand with a timing advance command.
4) The maximum aggregate autonomous timing adjustment step that a UE can do per 200 ms (~20 m at 350 km/h) in HST FR2 is 146.6 ns, which is significantly less than 2.3 μs. Thus, it is not sufficient to compensate for a timing difference of several microseconds.
5) UE should not transmit in UL, unless the UE has been assigned a correct $T_A$ to be applied. Otherwise, an UL transmission will cause interference, which may result in a considerable increase of the error rate or in a complete loss of data.

Some exemplary embodiments provide such a mechanism by enabling the network to indicate to the UE that the UE shall transmit a random-access preamble to the network in the target beam following a beam switch among DL beams originating from non-collocated TRPs (or APs). Based on the received preamble, the network is able to calculate the TA value to be applied by the UE, and the network signals the TA value to the UE for example by using a TAC or RAR. The source beam and the target beam of the beam switch may be associated with a single cell of a wireless communication network, or the source beam and the target beam may be associated with different cells of the wireless communication network. In other words, some exemplary embodiments are not limited to BM of one cell, as the target beam may also be from another cell than the source beam.

Figure 7:
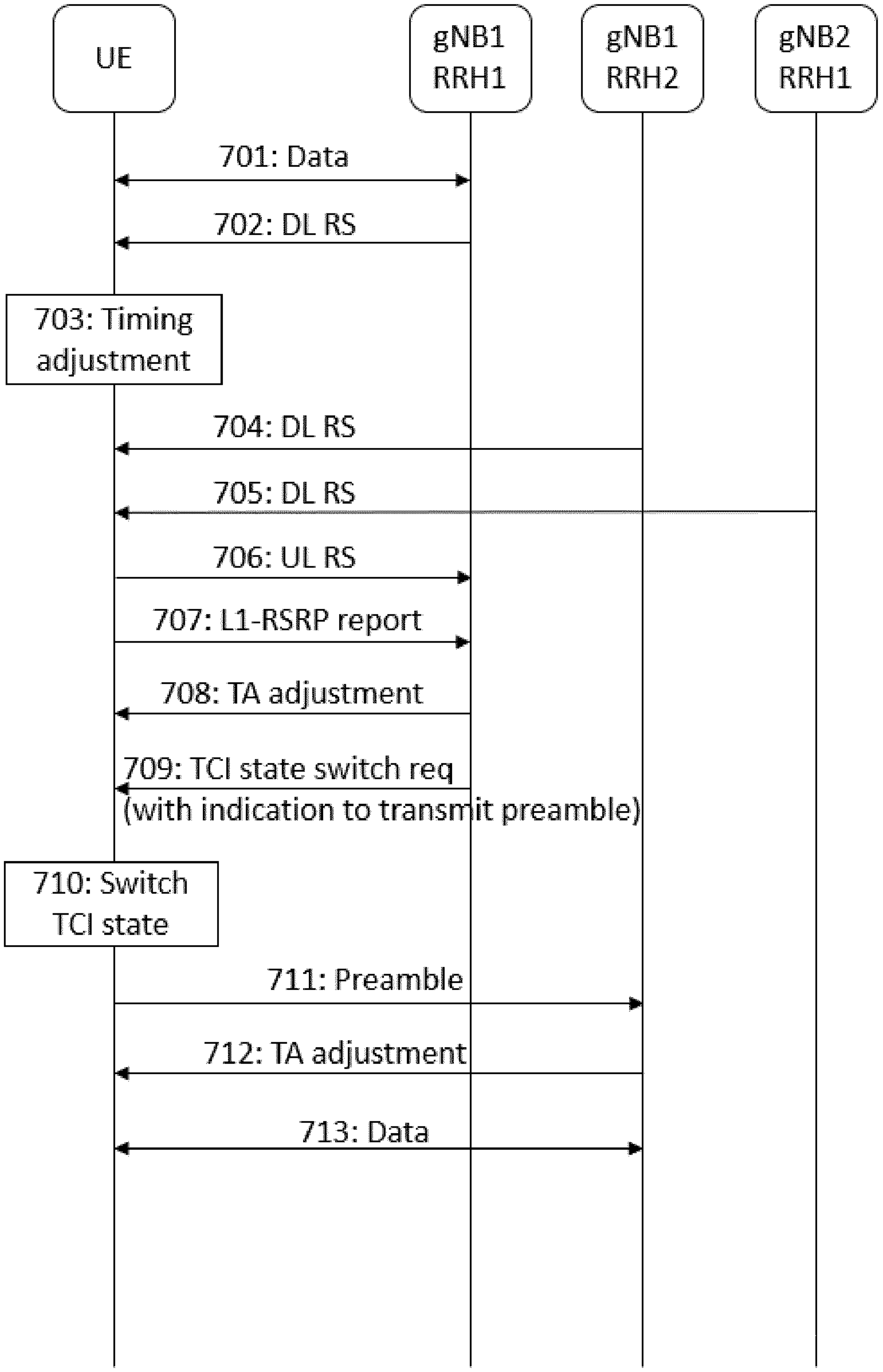
FIGS. 7 and 8 illustrate signaling diagrams according to some exemplary embodiments.

FIG. 7 illustrates a signaling diagram according to an exemplary embodiment, wherein the indication is transmitted to the UE together with the TCI state switch command (or request) 709. In other words, when the UE receives the TCI state switch command, the UE is also indicated, or requested, to perform a PRACH preamble transmission following the TCI state switch. The preamble may be a dedicated preamble (e.g. in CFRA), for example.

The UE (for example the CPE of FIG. 2 or any other UE) is in RRC connected mode and the UE is connected to a first base station (gNB1) via a first RRH (gNB1 RRH1) of gNB1. gNB1 may also comprise (or be connected to) a second RRH (gNB1 RRH2). Alternatively, the second RRH may be comprised in (or connected to) a different base station than the first RRH. In addition, a third RRH (gNB2 RRH1) connected to a second base station (gNB2) may also be present in the system as a potential target for a beam switch. gNB2 may be a neighbour cell of the current serving cell gNB1. The UE may be indicated by the network (e.g. by gNB1) to apply a method as described below, or the method may be pre-configured at the UE.

Referring to FIG. 7, while in connected mode and e.g. data transmissions 701 are ongoing between the UE and gNB1 RRH1, the UE may perform serving cell measurements (for example RSRP measurements) by using one or more DL reference signals (e.g. SSB and/or CSI-RS) received 702 from gNB1 RRH1. The UE may also perform gradual UE-autonomous timing adjustments 703, while the data transmissions 701 are ongoing. Additionally, the UE may perform serving and neighbour cell searches and measurements, including detecting other RRHs (DL beams) from the current serving cell (gNB1). In other words, the UE may receive 704, 705 one or more DL reference signals (e.g. SSB and/or CSI-RS) from gNB1 RRH2 and/or gNB2 RRH1 for performing neighbour cell measurements (e.g. RSRP measurements) for gNB1 RRH2 and/or gNB2 RRH1. The UE may transmit 706 one or more UL reference signals (e.g. DMRS or SRS) to gNB1 RRH1 for assisting $T_A$ estimation at gNB1. The UE may transmit 707 an L1-RSRP report to gNB1 RRH1 for assisting network beam management at gNB1. The L1-RSRP report may comprise the measurement results from gNB1 RRH1, gNB1 RRH2, and/or gNB2 RRH1.

It should be noted that the UE may perform some or all of steps 701-707 continuously (or iteratively).

gNB1 may calculate, for example based on the one or more UL reference signals or other signal(s) received from the UE, an adjusted $T_A$ value to be used by the UE. gNB1 may indicate 708 the adjusted $T_A$ value to the UE via gNB1 RRH1, for example by using a MAC CE $T_A$ update command (i.e. TAC) or a RAR message.

gNB1 determines, for example based on the UE L1-RSRP report, that there is a need to change the serving DL beam for example from gNB1 RRH1 to gNB1 RRH2. Therefore, gNB1 transmits 709 a TCI state switch command to the UE via gNB1 RRH1 in order to request the UE to do a TCI state switch to gNB1 RRH2. The TCI state switch command also comprises an indication that the UE shall perform a PRACH preamble transmission following the TCI state switch. Any type of PRACH preamble may be used as the preamble to be transmitted following the TCI state switch. For example, the preamble to be transmitted may be a dedicated preamble for this specific UE (e.g. in CFRA). As another example, the preamble transmission may follow CBRA, in which case the UE may not be allocated a dedicated preamble.

The UE switches 710 the TCI state based on the TCI state switch command received from gNB1 RRH1. The UE transmits 711 the preamble to gNB1 RRH2 for example by using the dedicated preamble, if such a dedicated preamble has been allocated. Otherwise, the UE may use any PRACH preamble.

Following the reception of the preamble, gNB1 calculates, based on the received preamble, an adjusted $T_A$ value to be used by the UE. gNB1 indicates 712 the adjusted $T_A$ value to the UE via gNB1 RRH2, for example by using a MAC CE $T_A$ update command (i.e. TAC) or a RAR message. The UE may then transmit 713 uplink data to gNB1 RRH2 based at least partly on the adjusted $T_A$ value indicated from gNB1 RRH2. The UE may also perform UE-autonomous timing adjustment in addition to using the $T_A$ value received from gNB1 RRH2.

It should be noted that the TCI state switch may alternatively be performed to gNB2 RRH1 instead of gNB1 RRH2, depending on the measurement results in the L1-RSRP report. In this case, the UE may transmit the preamble to gNB2 RRH1. gNB2 may then calculate the $T_A$ value to be used by the UE, and indicate the $T_A$ value to the UE via gNB2 RRH1. The UE may then transmit uplink data to gNB2 RRH1 by applying the $T_A$ value indicated from gNB2 RRH1. In other words, the target RRH of the beam switch may also be from another base station than the serving base station associated with the source RRH.

It should also be noted that the number of RRHs may differ from what is shown in FIG. 7. For example, gNB1 may comprise more than two RRHs.

Figure 8:
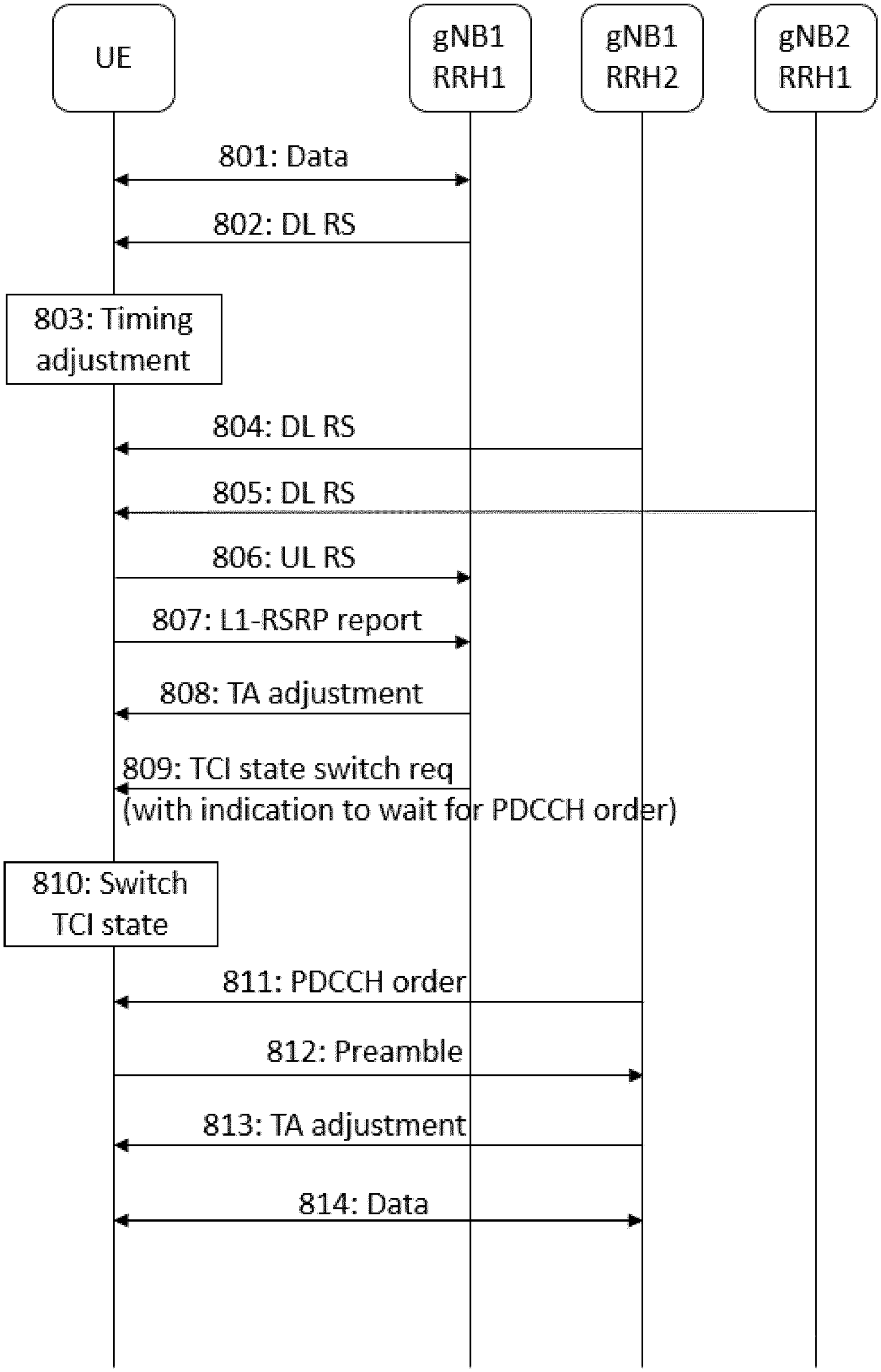

FIG. 8 illustrates a signaling diagram according to another exemplary embodiment, wherein the UE is indicated that the UE will be addressed using a PDCCH order (or similar message) after the TCI switch, before the UE is allowed to perform an UL transmission in the target TCI state.

The UE (for example the CPE of FIG. 2 or any other UE) is in RRC connected mode and the UE is connected to a first base station (gNB1) via a first RRH (gNB1 RRH1) of gNB1. gNB1 may also comprise (or be connected to) a second RRH (gNB1 RRH2). Alternatively, the second RRH may be comprised in (or connected to) a different base station than the first RRH. In addition, a third RRH (gNB2 RRH1) connected to a second base station (gNB2) may also be present in the system as a potential target for a beam switch. gNB2 may be a neighbour cell of the current serving cell gNB1. The UE may be indicated by the network (e.g. by gNB1) to apply a method as described below, or the method may be pre-configured at the UE.

Referring to FIG. 8, while in connected mode and e.g. data transmissions 801 are ongoing between the UE and gNB1 RRH1, the UE may perform serving cell measurements (for example RSRP measurements) by using one or more DL reference signals (e.g. SSB and/or CSI-RS) received 802 from gNB1 RRH1. The UE may also perform gradual UE-autonomous timing adjustments 803, while the data transmissions 701 are ongoing. Additionally, the UE may perform serving and neighbour cell searches and measurements, including detecting other RRHs (DL beams) from the current serving cell (gNB1). In other words, the UE may receive 804, 805 one or more DL reference signals (e.g. SSB and/or CSI-RS) from gNB1 RRH2 and/or gNB2 RRH1 for performing neighbour cell measurements (e.g. RSRP measurements) for gNB1 RRH2 and/or gNB2 RRH1. The UE may transmit 806 one or more UL reference signals (e.g. DMRS or SRS) to gNB1 RRH1 for assisting $T_A$ estimation at gNB1. The UE may transmit 807 an L1-RSRP report to gNB1 RRH1 for assisting network beam management at gNB1. The L1-RSRP report may comprise the measurement results from gNB1 RRH1, gNB1 RRH2, and/or gNB2 RRH1.

It should be noted that the UE may perform some or all of steps 801-807 continuously (or iteratively).

gNB1 may calculate, for example based on the one or more UL reference signals or other signal(s) received from the UE, an adjusted $T_A$ value to be used by the UE. gNB1 may indicate 808 the adjusted $T_A$ value to the UE via gNB1 RRH1, for example by using a MAC CE $T_A$ update command (i.e. TAC) or a RAR message.

gNB1 determines, for example based on the UE L1-RSRP report, that there is a need to change the serving DL beam for example from gNB1 RRH1 to gNB1 RRH2. Therefore, gNB1 transmits 809 a TCI state switch command to the UE via gNB1 RRH1 in order to request the UE to do a TCI state switch to gNB1 RRH2. The TCI state switch command also comprises an indication that the UE needs to wait for a network PDCCH order (or some other message with the purpose of triggering the UE to transmit a PRACH preamble) in the target TCI state before initiating any UL transmission from the UE. In other words, the TCI state switch command indicates that the UE shall not initiate any UL transmission until the PDCCH order (or other message) is received from gNB1 RRH2.

The UE switches 810 the TCI state based on the TCI state switch command received from gNB1 RRH1. The UE listens to DL until it receives 811 the PDCCH order (or other message), based on which the UE transmits 812 a PRACH preamble to gNB1 RRH2 for example by using a dedicated preamble, if such a dedicated preamble has been allocated. Otherwise, the UE may use any PRACH preamble. In other words, the UE transmits the PRACH preamble to gNB1 RRH2 in response to the reception of the PDCCH order (or other message) from gNB1 RRH2.

Following the reception of the preamble, gNB1 calculates, based on the received preamble, an adjusted $T_A$ value to be used by the UE. gNB1 indicates 813 the adjusted $T_A$ value to the UE via gNB1 RRH2, for example by using a MAC CE $T_A$ update command (i.e. TAC) or a RAR message. The UE may then transmit 814 uplink data to gNB1 RRH2 based at least partly on the adjusted $T_A$ value indicated from gNB1 RRH2. The UE may also perform UE-autonomous timing adjustment in addition to using the $T_A$ value received from gNB1 RRH2.

It should be noted that the TCI state switch may alternatively be performed to gNB2 RRH1 instead of gNB1 RRH2, depending on the measurement results in the L1-RSRP report. In this case, the UE may receive the PDCCH order from gNB2 RRH1 and transmit the preamble to gNB2 RRH1. gNB2 may then calculate the $T_A$ value to be used by the UE, and indicate the $T_A$ value to the UE via gNB2 RRH1. The UE may then transmit uplink data to gNB2 RRH1 by applying the $T_A$ value indicated from gNB2 RRH1.

It should also be noted that the number of RRHs may differ from what is shown in FIG. 8. For example, gNB1 may comprise more than two RRHs.

Figure 9:
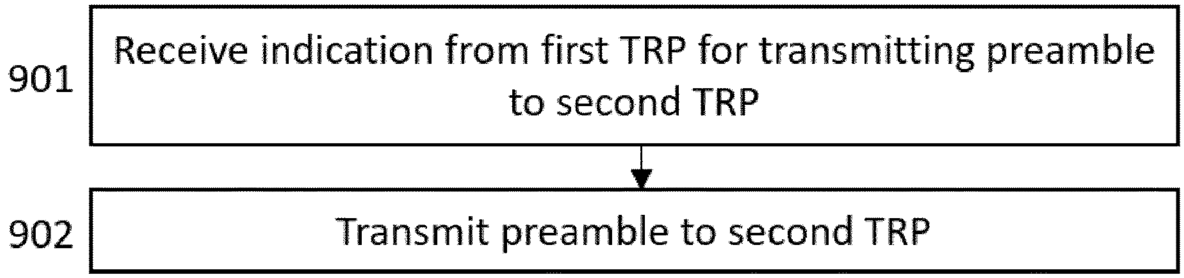
FIGS. 9 and 10 illustrate flow charts according to some exemplary embodiments.

FIG. 9 illustrates a flow chart according to an exemplary embodiment. The functions illustrated in FIG. 9 may be performed by an apparatus such as, or comprised in, a UE. Referring to FIG. 9, the apparatus receives 901, from a first transmission and reception point (TRP) of a wireless communication network, an indication for transmitting a random-access preamble to a second transmission and reception point of the wireless communication network after a beam switch from a source beam of the first transmission and reception point to a target beam of the second transmission and reception point. The apparatus transmits 902 the random-access preamble to the second transmission and reception point after the beam switch. Herein a TRP may refer to any source of DL transmission, for example a base station, a gNB, a DU, an access point (AP), an antenna panel, a radio head, a remote radio head (RRH), or a transmission and reception point (TRP).

Figure 10:
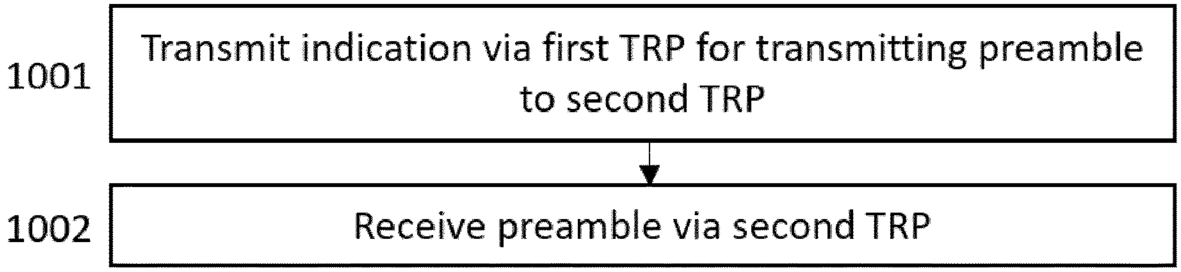

FIG. 10 illustrates a flow chart according to an exemplary embodiment. The functions illustrated in FIG. 10 may be performed by an apparatus such as, or comprised in, a base station. Referring to FIG. 10, the apparatus transmits 1001, to a terminal device (UE), via a first transmission and reception point (TRP), an indication for transmitting a random-access preamble to a second transmission and reception point after a beam switch from a source beam of the first transmission and reception point to a target beam of the second transmission and reception point. The random-access preamble is received 1002 from the terminal device via the second transmission and reception point. Herein a TRP may refer to any source of DL transmission, for example a base station, a gNB, a DU, an access point (AP), an antenna panel, a radio head, a remote radio head (RRH), or a transmission and reception point (TRP).

The functions and/or blocks described above by means of FIGS. 7-10 are in no absolute chronological order, and some of them may be performed simultaneously or in an order differing from the described one. Other functions and/or blocks may also be executed between them or within them.

Figure 11:
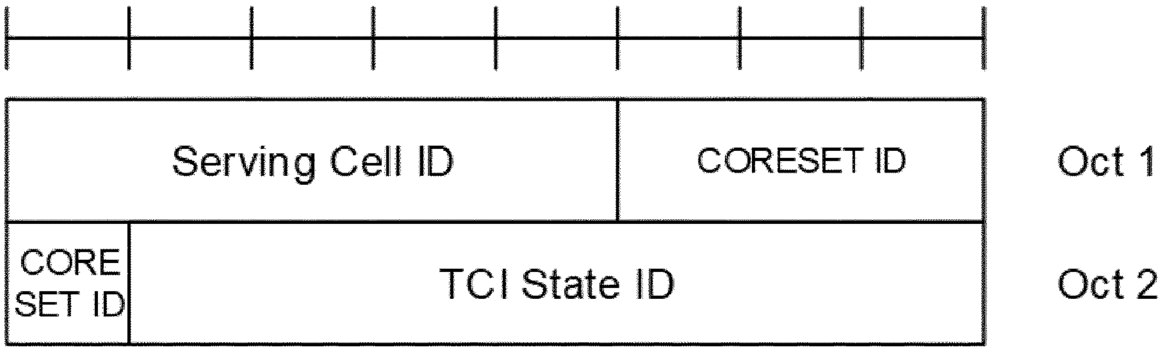
FIG. 11 illustrates transmission configuration indicator state indication for a medium access control control element.

FIG. 11 illustrates TCI state indication for a UE-specific PDCCH MAC CE, wherein the TCI state indication for the UE-specific PDCCH MAC CE is identified by a MAC subheader with a logical channel identifier (LCID). Some exemplary embodiments may be realized by using the MAC CE for TCI state indication and defining a special CORESET (control resource set) identifier (ID) or reserving/defining a TCI state ID to ensure that the UE receives the indication indicating that the UE should transmit the PRACH preamble in the target TCI state (beam) following the TCI state switch, or the indication that the UE should wait for a PDCCH order in the target TCI state (beam) following the switch. However, this is just one non-limiting example, as some exemplary embodiments may be realized in many different ways.

Referring to FIG. 11, the serving cell ID field indicates the identity of the serving cell, for which the MAC CE applies. The length of the serving cell ID field may be 5 bits, for example. The CORESET ID field indicates a control resource set, for which the TCI state is being indicated. The length of the CORESET ID field may be 4 bits, for example. The TCI state ID field indicates the TCI state applicable to the control resource set identified by the CORESET ID field. The length of the TCI state ID field may be 7 bits, for example.

Some exemplary embodiments may be applied to NR and to the FR2 HST scenario, for example. However, some exemplary embodiments are not limited in use or applicability to neither NR nor the FR2 HST scenario. Some exemplary embodiments may be applied to any scenario that involves UE mobility and distributed RRHs/TRPs, for example in highway deployments.

A technical advantage provided by some exemplary embodiments is that they enable a more accurate TA adjustment when performing a TCI state switch (beam switch) among DL beams originating from non-collocated TRPs (for example in the FR2 HST scenario). Thus, some exemplary embodiments may help to avoid significant degradation of connection quality as well as connection breaks in UL, for example when there is a large DL propagation delay difference between the source TRP and target TRP.

Figure 12:
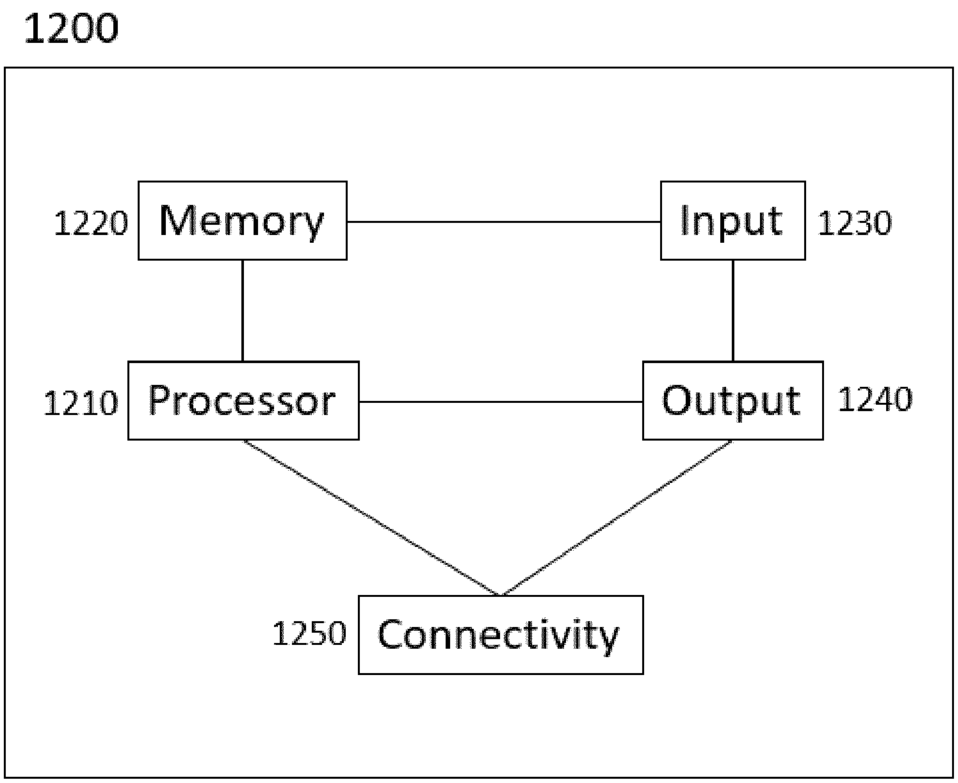
FIGS. 12 and 13 illustrate apparatuses according to some exemplary embodiments.

FIG. 12 illustrates an apparatus 1200, which may be an apparatus such as, or comprised in, a terminal device, according to an exemplary embodiment. A terminal device may also be referred to as a UE or user equipment herein. The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application-specific integrated circuits (ASICs).

The processor 1210 is coupled to a memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1220 stores computer readable instructions that are executed by the processor 1210. For example, non-volatile memory stores the computer readable instructions and the processor 1210 executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1230 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components such as a power amplifier, digital front end (DFE), analog-to-digital converter (ADC), digital-to-analog (DAC), converter frequency converter, (de) modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
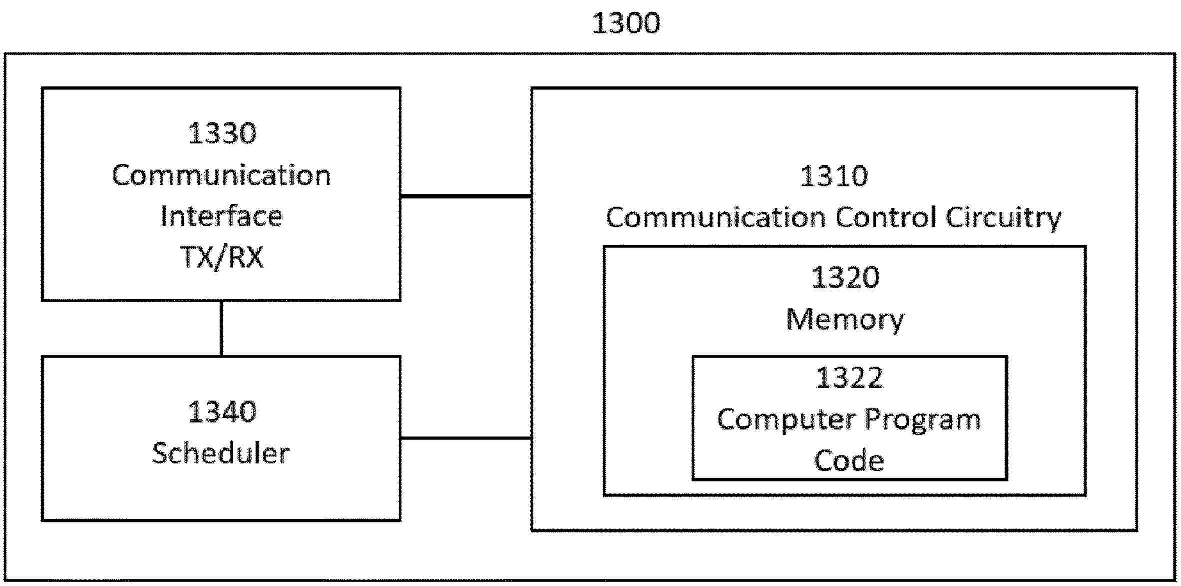

The apparatus 1300 of FIG. 13 illustrates an exemplary embodiment of an apparatus such as, or comprised in, a base station. The base station may be referred to, for example, as a NodeB, an LTE evolved nodeB (eNB), a gNB, an NR base station, a 5G base station, an access point (AP), a distributed unit (DU), a central unit (CU), a baseband unit (BBU), a radio unit (RU), a radio head, a remote radio head (RRH), or a transmission and reception point (TRP). The apparatus may comprise, for example, a circuitry or a chipset applicable to a base station for realizing some of the described exemplary embodiments. The apparatus 1300 may be an electronic device comprising one or more electronic circuitries. The apparatus 1300 may comprise a communication control circuitry 1310 such as at least one processor, and at least one memory 1320 including a computer program code (software) 1322 wherein the at least one memory and the computer program code (software) 1322 are configured, with the at least one processor, to cause the apparatus 1300 to carry out some of the exemplary embodiments described above.

The processor is coupled to the memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (TX) and at least one receiver (RX) that may be integrated to the apparatus 1300 or that the apparatus 1300 may be connected to. The communication interface 1330 provides the apparatus with radio communication capabilities to communicate in the cellular communication system. The communication interface may, for example, provide a radio interface to terminal devices. The apparatus 1300 may further comprise another interface towards a core network such as the network coordinator apparatus and/or to the access nodes of the cellular communication system. The apparatus 1300 may further comprise a scheduler 1340 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

LIST OF ABBREVIATIONS

4G: fourth generation
5G: fifth generation
ADC: analog-to-digital converter
AP: access point
ASIC: application-specific integrated circuit
BBU: baseband unit
BM: beam management
CBRA: contention-based random access
CFRA: contention-free random access
CN: core network
CORESET: control resource set
CP: cyclic prefix
CPE: customer-premises equipment
CPS: cyber-physical system
CSI-RS: channel state information reference signal
CSSP: customer-specific standard product
CU: central unit
CU-CP: central unit control plane
CU-UP: central unit user plane
DAC: digital-to-analog converter
DCI: downlink control information
DFE: digital front end
DL: downlink
DMRS: demodulation reference signal
DPS: dynamic point switching
DRAM: dynamic random-access memory
DSP: digital signal processor
DSPD: digital signal processing device
DU: distributed unit
EEPROM: electronically erasable programmable read-only memory
eNB: LTE evolved nodeB/4G base station
FPGA: field programmable gate array
FR1: frequency range 1
FR2: frequency range 2
GEO: geostationary earth orbit
gNB: next generation nodeB/5G base station
GPU: graphics processing unit
HNB-GW: home node B gateway
HST: high-speed train
IAB: integrated access and backhaul
ID: identifier
IMS: internet protocol multimedia subsystem
IoT: internet of things
L1: Layer 1
L2: Layer 2
L3: Layer 3
LCD: liquid crystal display
LCID: logical channel identifier
LCOS: liquid crystal on silicon
LED: light emitting diode
LEO: low earth orbit
LTE: long term evolution
LTE-A: long term evolution advanced
M2M: machine-to-machine
MAC CE: medium access control control element
MAC: medium access control
MANET: mobile ad-hod network
MEC: multi-access edge computing
MIMO: multiple input and multiple output
MME: mobility management entity
mMTC: massive machine-type communications
MT: mobile termination
NFV: network function virtualization
NGC: next generation core
NR: new radio
PBCH: physical broadcast channel
PCS: personal communications services
PDA: personal digital assistant PDCCH: physical downlink control channel
PDCP: packet data convergence protocol
P-GW: packet data network gateway
PHY: physical
PLD: programmable logic device
PRACH: physical random-access channel
PROM: programmable read-only memory
PSS: primary synchronization signal
PUCCH: physical uplink control channel
PUSCH: physical uplink shared channel
RA: random access
RAM: random-access memory
RAN: radio access network
RAP: radio access point
RAR: random-access response
RAT: radio access technology
RI: radio interface
RLC: radio link control
ROM: read-only memory
RRC: radio resource control
RRH: remote radio head
RS: reference signal
RSRP: reference signal received power
RU: radio unit
RX: receiver
SCS: subcarrier spacing
SDAP: service data adaptation protocol
SDN: software defined networking
SDRAM: synchronous dynamic random-access memory
SFN: single-frequency network
S-GW: serving gateway
SIM: subscriber identification module
SoC: system-on-a-chip
SRS: sounding reference signal
SSB: synchronization signal block
SSS: secondary synchronization signal
TA: timing advance
TAC: timing advance command
TAG: timing advance group
TCI: transmission configuration indicator
TRP: transmission and reception point
TRX: transceiver
TX: transmitter
UE: user equipment/terminal device
UL: uplink
UMTS: universal mobile telecommunications system
UTRAN: UMTS radio access network
UWB: ultra-wideband
vCU: virtualized central unit
vDU: virtualized distributed unit
WCDMA: wideband code division multiple access
WiMAX: worldwide interoperability for microwave access
WLAN: wireless local area network

The invention claimed is:

1. An apparatus comprising at least one processor, and at least one memory including computer program code, wherein the at least one memory and the computer program code are configured, with the at least one processor, to cause the apparatus to:

receive, from a first transmission and reception point of a wireless communication network, an indication for transmitting a random-access preamble to a second transmission and reception point of the wireless communication network after a beam switch from a source beam of the first transmission and reception point to a target beam of the second transmission and reception point; and transmit the random-access preamble to the second transmission and reception point after the beam switch.

2. An apparatus according to claim 1, wherein the indication received from the first transmission and reception point indicates to wait for a message from the second transmission and reception point before transmitting the random-access preamble to the second transmission and reception point;

wherein the apparatus is further caused to:

receive the message from the second transmission and reception point, wherein the random-access preamble is transmitted to the second transmission and reception point in response to the reception of the message from the second transmission and reception point.

3. An apparatus according to claim 2, wherein the message refers to a physical downlink control channel order.

4. An apparatus according to claim 1, wherein the apparatus is further caused to:

receive, from the first transmission and reception point, a transmission configuration indicator state switch command comprising a request for switching to a transmission configuration indicator state associated with the target beam of the second transmission and reception point;

wherein the indication for transmitting the random-access preamble to the second transmission and reception point is comprised in or received together with the transmission configuration indicator state switch command received from the first transmission and reception point; and perform the beam switch based on the transmission configuration indicator state switch command by switching to the transmission configuration indicator state associated with the target beam of the second transmission and reception point.

5. An apparatus according to claim 1, wherein the indication for transmitting the random-access preamble to the second transmission and reception point is indicated by a control resource set identifier or a transmission configuration indicator state identifier received from the first transmission and reception point.

6. An apparatus according to claim 1, wherein the apparatus is further caused to:

receive a timing advance value from the second transmission and reception point in response to the transmission of the random-access preamble; and transmit data to the second transmission and reception point based at least partly on the timing advance value received from the second transmission and reception point.

7. An apparatus according to claim 6, wherein the timing advance value is comprised in a timing advance command or in a random-access response received from the second transmission and reception point.

8. An apparatus according to claim 1, wherein the first transmission and reception point and the second transmission and reception point are located at different physical positions.

9. An apparatus according to claim 1, wherein the first transmission and reception point and the second transmission and reception point are associated with a first cell of the wireless communication network.

10. An apparatus according to claim 7, wherein the first transmission and reception point is associated with a first cell of the wireless communication network, and the second transmission and reception point is associated with a second cell of the wireless communication network.

11. The apparatus according to claim 1, wherein the first transmission and reception point comprises a first remote radio head of the wireless communication network, and the second transmission and reception point comprises a second remote radio head of the wireless communication network.

12. An apparatus according to claim 1, wherein the apparatus is comprised in a terminal device.

13. An apparatus comprising at least one processor, and at least one memory including computer program code, wherein the at least one memory and the computer program code are configured, with the at least one processor, to cause the apparatus to:

transmit, to a terminal device, via a first transmission and reception point, an indication for transmitting a random-access preamble to a second transmission and reception point after a beam switch from a source beam of the first transmission and reception point to a target beam of the second transmission and reception point; and receive the random-access preamble from the terminal device via the second transmission and reception point.

14. An apparatus according to claim 13, wherein the indication transmitted to the terminal device indicates to wait for a message from the second transmission and reception point before transmitting the random-access preamble to the second transmission and reception point;

wherein the apparatus is further caused to:

transmit the message to the terminal device via the second transmission and reception point, wherein the random-access preamble is received from the terminal device in response to the transmission of the message via the second transmission and reception point.

15. An apparatus according to claim 14, wherein the message refers to a physical downlink control channel order.

16. An apparatus according to claim 13, wherein the apparatus is further caused to:

transmit, to the terminal device, via the first transmission and reception point, a transmission configuration indicator state switch command comprising a request for switching to a transmission configuration indicator state associated with the target beam of the second transmission and reception point;

wherein the indication for transmitting the random-access preamble to the second transmission and reception point is comprised in or transmitted together with the transmission configuration indicator state switch command transmitted via the first transmission and reception point.

17. An apparatus according to claim 13, wherein the indication for transmitting the random-access preamble is indicated by a control resource set identifier or a transmission configuration indicator state identifier.

18. An apparatus according to claim 13, wherein the apparatus is further caused to:

determine a timing advance value based at least partly on the random-access preamble received from the terminal device; and transmit the timing advance value to the terminal device via the second transmission and reception point.

19. An apparatus according to claim 18, wherein the timing advance value is transmitted in a timing advance command or in a random-access response.

20. An apparatus according to claim 13, wherein the first transmission and reception point and the second transmission and reception point are located at different physical positions.

* * * * *